US012043505B2

(12) United States Patent
Chapman

(10) Patent No.: US 12,043,505 B2
(45) Date of Patent: Jul. 23, 2024

(54) ROLLER ASSEMBLY, AND FEED ROLLER SYSTEMS COMPRISING SAME

(71) Applicant: Shaw Industries Group, Inc., Dalton, GA (US)

(72) Inventor: Roy Frederick Chapman, Adairsville, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 17/876,113

(22) Filed: Jul. 28, 2022

(65) Prior Publication Data

US 2023/0030487 A1    Feb. 2, 2023

Related U.S. Application Data

(60) Provisional application No. 63/226,286, filed on Jul. 28, 2021.

(51) Int. Cl.
*B65H 27/00* (2006.01)
*B65H 51/04* (2006.01)

(52) U.S. Cl.
CPC ............. *B65H 27/00* (2013.01); *B65H 51/04* (2013.01); *B65H 2701/38* (2013.01)

(58) Field of Classification Search
CPC .... F16D 1/0805; F16D 1/0829; F16D 1/0852; F16D 1/087; F16D 1/104; F16D 1/08
USPC .......................................................... 492/47
See application file for complete search history.

(56) References Cited

U.S. PATENT DOCUMENTS

| | | | | | |
|---|---|---|---|---|---|
| 527,708 | A | * | 10/1894 | McCorkindale | B65H 18/26 492/47 |
| 2,583,117 | A | * | 1/1952 | Piperoux | F16D 1/0805 279/2.07 |
| 3,378,902 | A | * | 4/1968 | Hoexter | F16D 1/0805 279/4.06 |
| 3,516,681 | A | * | 6/1970 | Cox | B23B 31/305 279/4.03 |
| 4,093,052 | A | * | 6/1978 | Falk | F16D 1/0805 403/372 |
| 4,264,229 | A | * | 4/1981 | Falk | F16D 9/06 192/85.13 |
| 4,326,793 | A | * | 4/1982 | Buholtz | G03G 15/751 384/546 |
| 4,341,484 | A | * | 7/1982 | Peterson | F16D 1/0805 192/85.13 |

(Continued)

*Primary Examiner* — Jason L Vaughan
(74) *Attorney, Agent, or Firm* — Ballard Spahr LLP

(57) ABSTRACT

A roller assembly having a central axis can comprise a roller having an outer surface and defining an inner bore. The apparatus can further comprise a bushing comprising a sleeve having an outer surface and defining an inner bore. The inner bore of the sleeve can have an operative circumference. The sleeve comprises a bladder that is configured to expand radially upon receipt of a fluid to reduce the operative circumference of the inner bore. The bushing can further comprise a flange extending radially outwardly from the sleeve. The flange defines a vessel containing fluid therein. The vessel is in fluid communication with the bladder of the sleeve. The bushing comprises an actuator that is configured to cause the fluid from the vessel of the flange to flow into the bladder of the sleeve. An alignment feature can be configured to rotationally position the roller relative to the bushing.

21 Claims, 15 Drawing Sheets

(56) References Cited

U.S. PATENT DOCUMENTS

| | | | | |
|---|---|---|---|---|
| 4,393,567 | A | * | 7/1983 | Disborg ................ B23B 31/305 |
| | | | | 192/85.13 |
| 4,752,275 | A | * | 6/1988 | Lindenthal ................ F16D 9/00 |
| | | | | 403/5 |
| 4,923,320 | A | * | 5/1990 | Klischat ................ F16D 43/211 |
| | | | | 192/56.3 |
| 5,051,018 | A | * | 9/1991 | Appell ...................... F16D 9/06 |
| | | | | 403/5 |
| 5,195,838 | A | * | 3/1993 | Katz .................. B41F 13/0008 |
| | | | | 74/401 |
| 5,481,975 | A | * | 1/1996 | Schulz .................. B41F 27/105 |
| | | | | 492/58 |
| 5,507,228 | A | * | 4/1996 | Schulz .................. B41F 27/105 |
| | | | | 492/58 |
| 5,516,243 | A | * | 5/1996 | Laube .................. B23B 31/305 |
| | | | | 408/239 R |

\* cited by examiner

ROLLER ASSEMBLY, AND FEED ROLLER SYSTEMS COMPRISING SAME

CROSS-REFERENCE TO RELATED APPLICATION

This application claims priority to and the benefit of the filing date of U.S. Provisional Patent Application No. 63/226,286, filed Jul. 28, 2021, the entirety of which is hereby incorporated by reference herein.

FIELD

This application relates generally to apparatuses, systems, and methods for providing rollers, such as, for example, feed rollers of a yarn or cloth feed roller system, which can optionally be used to provide yarn or cloth material during a tufting (e.g., carpet tufting) process.

BACKGROUND

Rollers, such as those used in yarn and cloth feed roller systems, comprise a roller that couples to a shaft. For example, referring to FIG. 1, a conventional yarn roller 10 has a header 12 welded within an outer cylindrical tube 14. The header 12 has an outer diameter that is receivable into the inner diameter of the outer cylindrical tube 14. The header 12 defines a keyway 16 that receives a key 18 to engage a corresponding keyway in a shaft. A cam 20 has a pair of engagement elements 22 that move along a screw 24 toward and away from each other along a transverse axis that is perpendicular to a central axis of the outer cylindrical tube. The engagement elements 22 define a groove 26 that is configured to receive and bias against a shaft. Rotation of the screw 24 in a clockwise direction draws the engagement elements 22 toward each other until the groove 26 frictionally engages the shaft. Referring to FIG. 2, a conventional cloth feed roller defines a split header 30 that is received within and welded to split ends of an outer cylindrical tube 32. Transversely extending screws extend between the halves of the split header 30 so that tightening of the screws draws the halves of the split header 30 toward each other to bias against the shaft.

In the conventional systems, the couplings between the roller and the shaft become loose over time. For example, movement of the screws resulting from vibration during use of the rollers can loosen the engagement with the shaft. Thus, the systems need to be stopped to tighten the couplings, thereby halting production. Accordingly, an improved system that reduces loosening of the couplings is desirable.

SUMMARY

Described herein, in various aspects, is a roller assembly having a central axis. The roller assembly can comprise a roller having an outer surface and defining an inner bore. The roller assembly can further comprise a bushing comprising a sleeve having an outer surface and defining an inner bore. The inner bore of the sleeve can have an operative circumference. The sleeve can comprise a bladder that is configured to expand radially upon receipt of a fluid to reduce the operative circumference of the inner bore. The bushing can further comprise a flange extending radially outwardly from the sleeve. The flange can define a vessel containing fluid therein, wherein the vessel is in fluid communication with the bladder of the sleeve. The bushing can further comprise an actuator that is configured to cause the fluid from the vessel of the flange to flow into the bladder of the sleeve. An alignment feature can be configured to rotationally position the roller relative to the bushing.

A method can comprise inserting a shaft into a roller assembly as disclosed herein. The actuator can be actuated to cause the bushing to frictionally engage the shaft to inhibit rotational movement between the bushing and the shaft.

A system can comprise a plurality of roller assemblies as disclosed herein. The system can be, for example, a yarn feed roller system or a cloth feed roller system.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
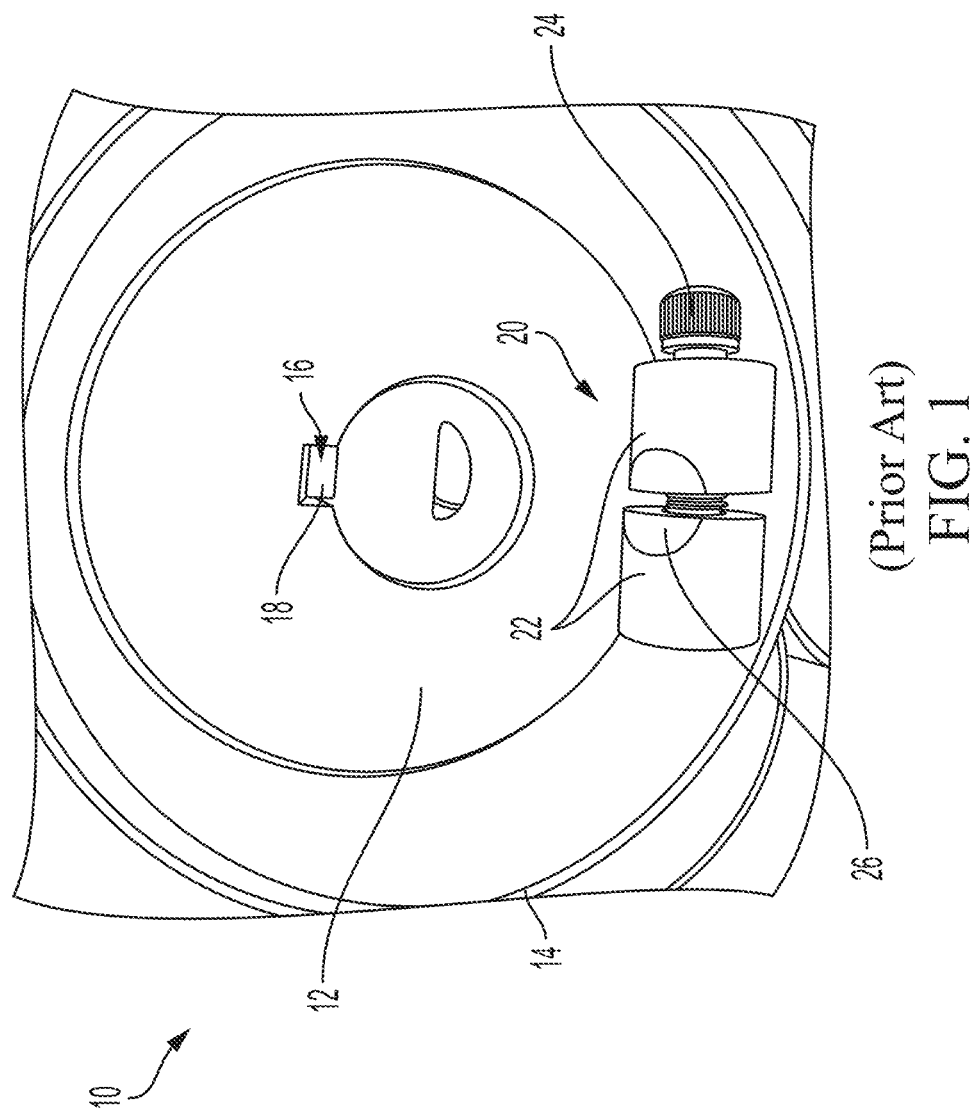
FIG. 1 is an end view of a conventional yarn feed roller.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a", "an," and "the" include plural references unless the context clearly dictates otherwise. Thus, for example, reference to "a bushing" includes one or more of such bushings, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. In further optional aspects, when angular orientations are approximated by use of the antecedents "about," "substantially," or "generally," it is contemplated that angular values within up to 15 degrees, up to 10 degrees, up to 5 degrees, or up to 1 degree (above or below) of the particularly stated angular orientation can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step. Unless otherwise stated, for any disclosed embodiment that "comprises" a combination of features as disclosed herein, this description should be treated as disclosing other embodiments that "consist of" or "consist essentially of" the same combination of features recited in the disclosed embodiment.

Referring to FIGS. 3-10, a roller assembly 50 having a central axis 52 can comprise a roller 54. The roller 54 can be rotatable around the central axis 52. The roller 54 can have an outer surface 56 and can define an inner bore 58. In some aspects, the roller 54 can comprise a hollow cylindrical tube 60 that defines the outer surface 56 of the roller 54. An annular body 62 (e.g., a header) can be received within the hollow cylindrical tube. The annular body 62 can define the inner bore 58 of the roller 54. In some aspects, the annular body 62 can couple to the hollow cylindrical tube 60 via weldment. In some optional aspects, the roller 54 can have an outer diameter of four inches or five inches. For example, the roller 54 can be a yarn roller that is five inches, or about five inches, in diameter. In further aspects, the roller 54 can be a cloth roller that is four inches, or about four inches, in diameter. In further aspects, the roller can be any suitable diameter (e.g., optionally, between about 2 inches and about 24 inches, between about 3 inches and about 12 inches, or between about 4 inches and about 6 inches).

With reference to FIGS. 4 and 6-10, a bushing 70 can be at least partially received (optionally, fully received) within the inner bore 58 of the roller 54. The bushing 70 can comprise a sleeve 72 having an outer surface 76 and defining an inner bore 77. Each of the inner bore 77 and the outer surface 76 of the sleeve 72 can have respective operative circumferences. The sleeve 72 can comprise a bladder 78 therein that is configured to expand radially upon receipt of a fluid. The expansion of the bladder 78 can reduce the operative circumference and/or operative diameter of the inner bore 77 of the sleeve 72, thereby coupling the bushing 70 to a shaft 120 that is inserted into the bushing as further disclosed herein. In further aspects, the expansion of the bladder 78 can increase the operative circumference of the outer surface 76 of the sleeve 72, thereby coupling the bushing 70 to the annular body 62. That is, the sleeve 72 can expand to frictionally engage the inner bore 58 defined by the annular body, thereby coupling the bushing 70 to the roller 54. In some aspects, the bushing 70 can be a keyless shaft bushing. Although specific embodiments of the bushing 70 are disclosed, it is contemplated that other bushings can be used without departing from the scope of this disclosure.

A flange 80 can extend radially outwardly from the sleeve 72. The flange 80 can define a hole 82 therethrough that is parallel or substantially parallel to the central axis 52. The flange 80 can define a vessel 84 containing fluid therein. The vessel 84 can be in fluid communication with the bladder 78 of the sleeve 72, for example, via a channel 86.

An actuator 90 can be configured to cause fluid from the vessel 84 to flow into the bladder 78. For example, the actuator 90 can comprise a fastener, such as a screw 92 (e.g., a set screw), that is coupled to (e.g., optionally, integral to) a piston 94. Rotation of the screw 92 can cause axial movement of the piston 94 along an axis 100. In some optional aspects, the axis 100 can be transverse to, and radially offset from, the central axis 52 of the roller assembly 50. The piston 94 can move along the vessel 84 to reduce the operative volume of the vessel, thereby displacing the fluid from the vessel 84, through the channel 86, and into the bladder 78. Thus, the actuator 90 can be at least partly disposed within the flange 80 of the bushing 70. Optionally, the actuator 90 can have only one screw. In further aspects, the actuator 90 can comprise a plurality of screws.

In some aspects, the actuator 90 can be within the interior of the hollow cylindrical tube 60. For example, in some aspects, the roller 54 can have a first axial end 102 and an opposed second axial end 104. The bushing 70 can be positioned at least partially (optionally, entirely) between the first and second axial ends 102, 104 of the roller 54. Thus, in some aspects, the roller 54 can define an opening 106 (FIG. 11) that can receive a driver (e.g., a screw driver) to access the fastener (e.g., screw 92). Accordingly, the opening 106 can be positioned axially along the central axis 52 and rotationally (circumferentially) about the outer surface 56 of the roller 54 in order to enable a driver inserted therethrough to access the screw 92.

To align the opening 106 with the fastener (e.g., screw 92) of the actuator 90, the bushing 70 can be in a predetermined rotational position relative to the roller 54. In some optional aspects, an alignment element 96 can extend through the hole 82 and into the annular body 62 to fix a rotational position of the bushing 70 relative to the roller. For example, the bushing can define a hole 97 (optionally, a blind hole or a through hole). Optionally, the hole 97 can have at least one female thread 98, and the alignment element 96 can be a fastener. For example, the alignment element 96 can be a screw that is received by the at least one female thread of the annular body 62. In further aspects, the alignment element 96 can be a pin. In various aspects, the alignment element 96 received within the hole 97 can serve as an alignment feature that rotationally aligns the bushing 70 with the roller 54. In yet further aspects, the roller assembly 50 can comprise any alignment feature that is configured to rotationally position the roller relative to the bushing. For example, the bushing 70 can define a contour that is configured to mate with a complementary contour of the annular body 62. Optionally, said contour of the bushing 70 can be machined into the bushing.

The bushing 70 can have a first end 110 and a second axial end 112 that are spaced along the central axis 52. In some optional aspects, the flange 80 can be positioned at the first axial end of the bushing 70. The flange can define an inner face 114 that is axially spaced from the first axial end. Optionally, the inner face 114 can be positioned against the annular body 62.

The roller assembly 50 can further comprise a shaft 120 that is received within the inner bore 78 of the sleeve 72 of the bushing 70. The bushing 70 can be configured with the actuator positioned, and the bladder inflated, so that the inner bore 78 of the sleeve 72 biases against the shaft 120. In this way, frictional engagement between the shaft and the bushing can thereby inhibit rotational movement between the shaft and the bushing. It is further contemplated that the bushing can bias radially outwardly against (thereby, frictionally engaging) the inner bore 58 of the roller 54. In this way, the roller 54 can be fixedly coupled to the shaft 120 so that rotation of the shaft causes rotation of the roller, and vice versa.

In some optional aspects, the roller assembly 50 can be keyless. Thus, in some optional aspects, neither the bushing 70 nor the shaft 120 defines a keyway.

Figure 2:
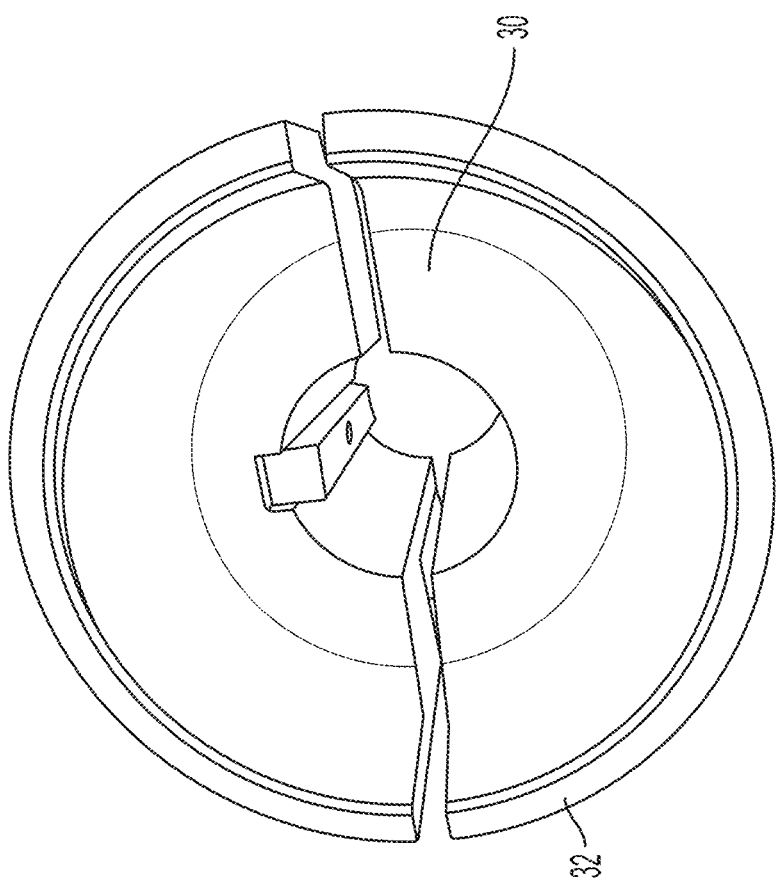
FIG. 2 is an end view of a conventional cloth feed roller.
Figure 3:
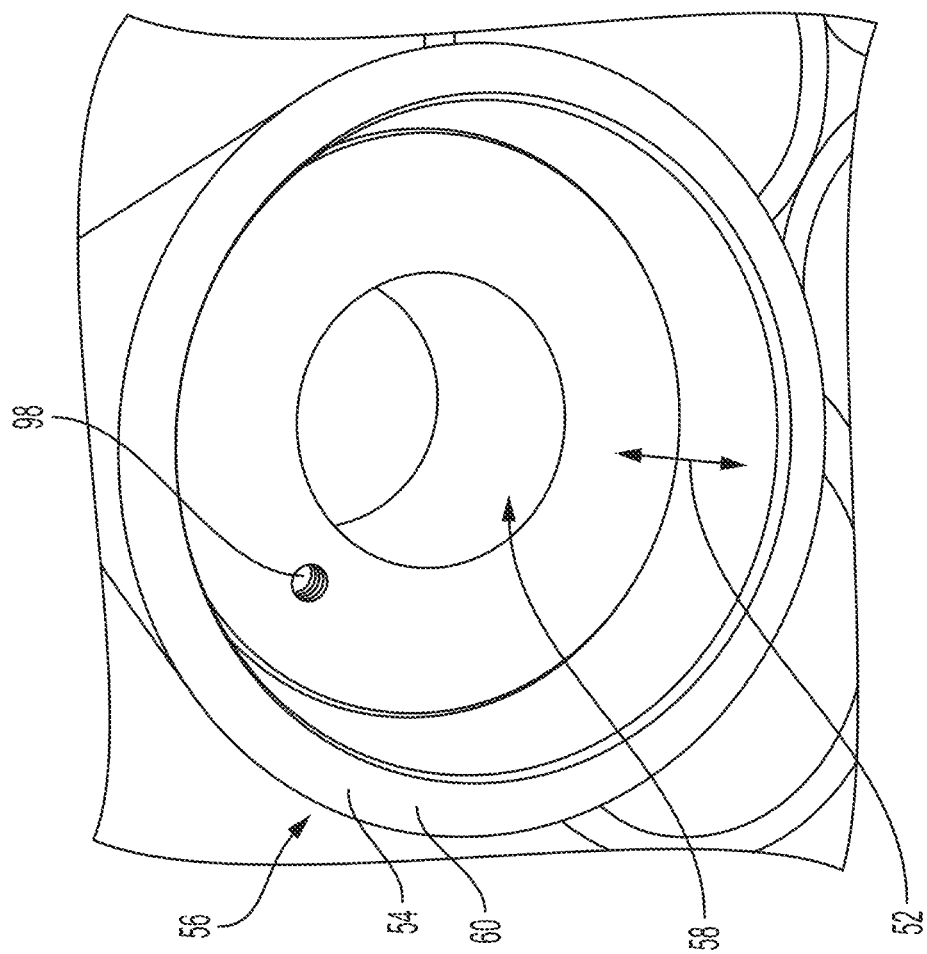
FIG. 3 is an end view of an exemplary roller in accordance with embodiments disclosed herein.
Figure 4:
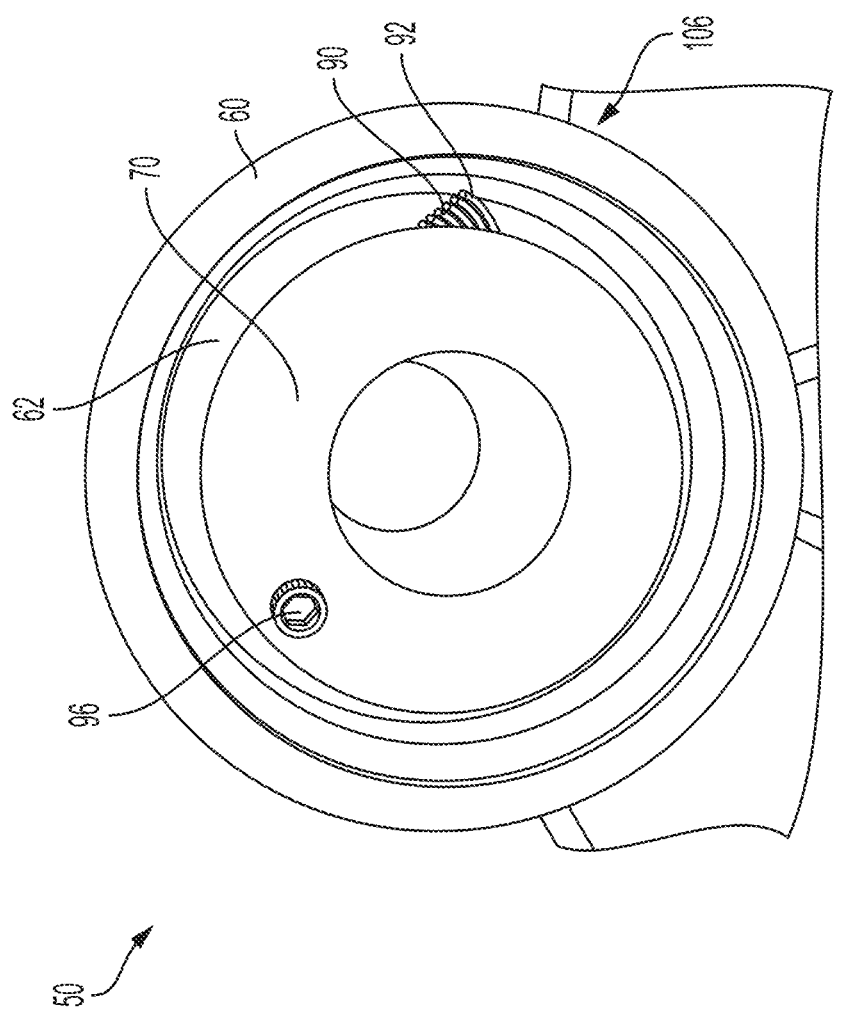
FIG. 4 is an end view of an exemplary roller assembly comprising the roller of FIG. 3.
Figure 5:
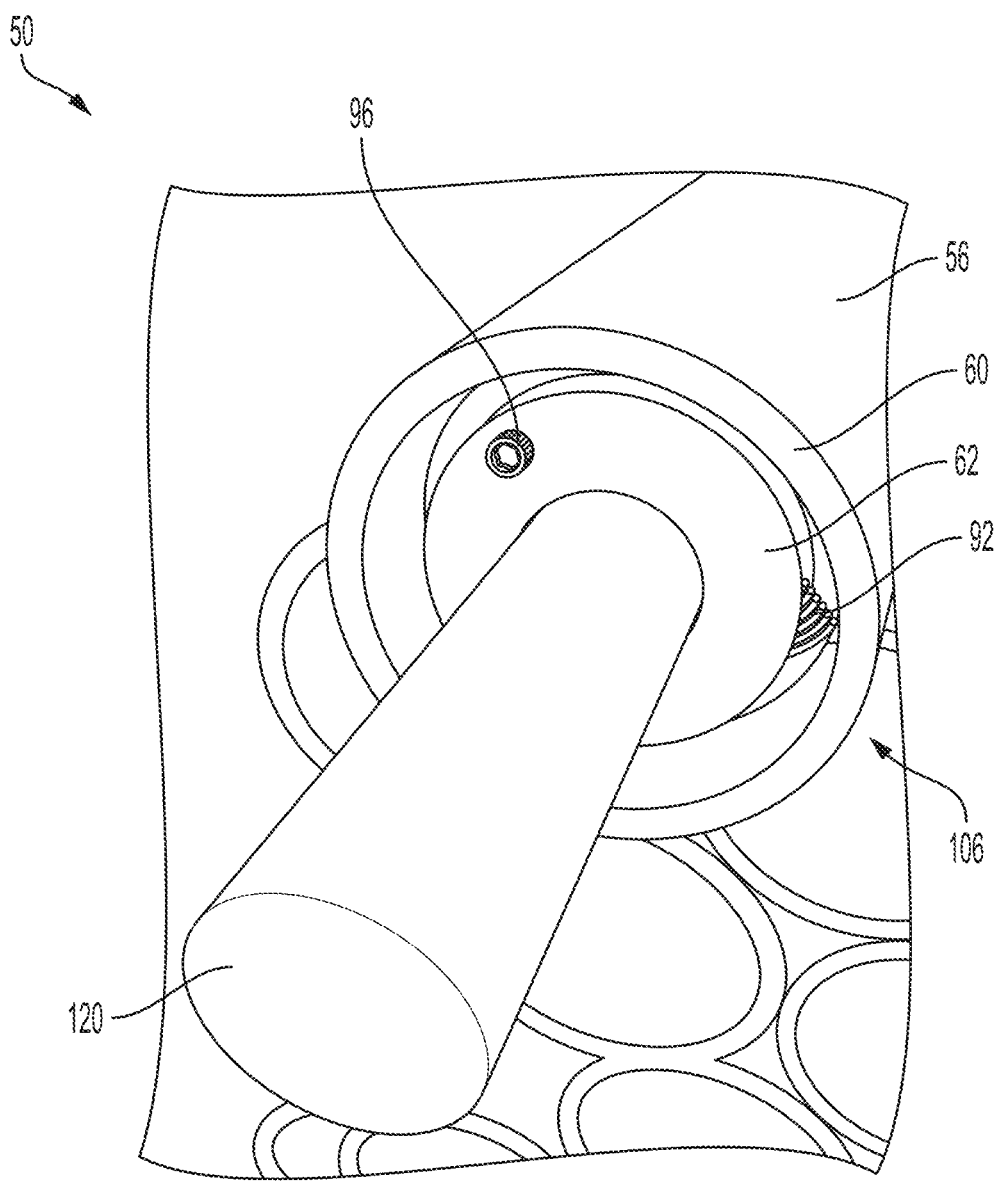
FIG. 5 is a perspective view of the roller assembly of FIG. 4, further compromising a shaft.
Figure 6:
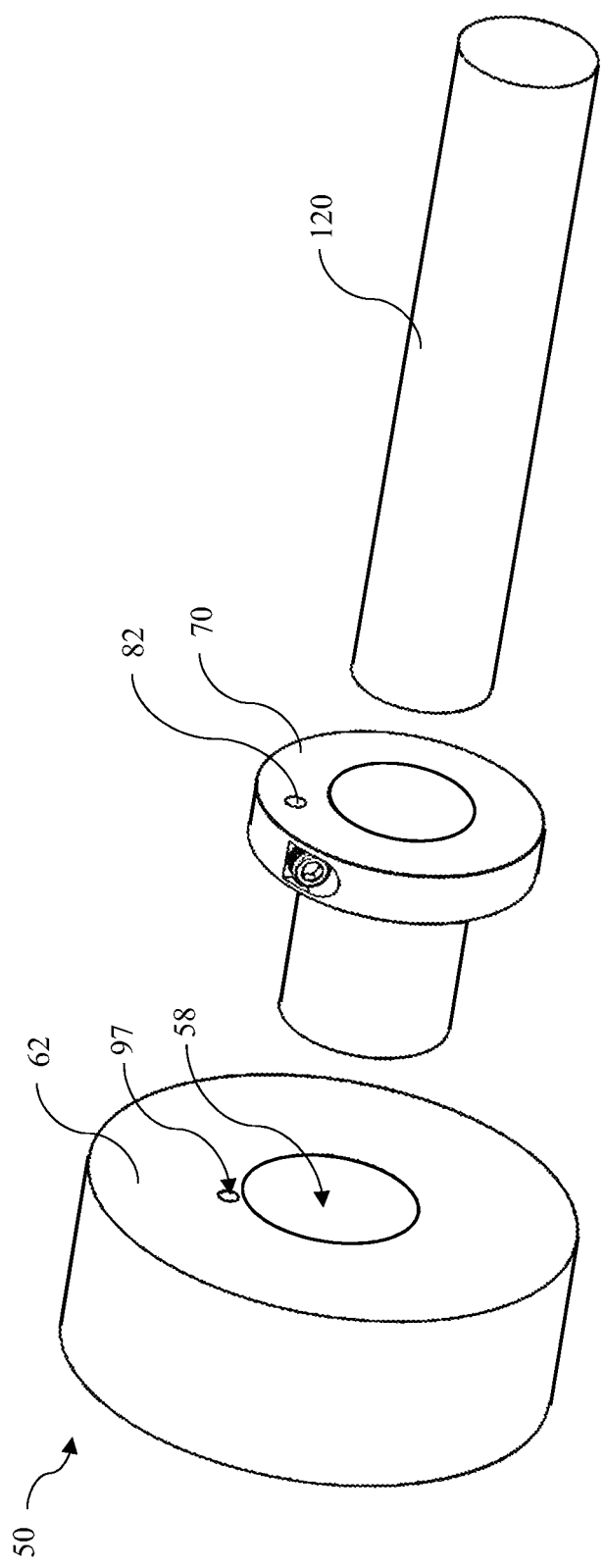
FIG. 6 is an exploded perspective view of an exemplary roller assembly as disclosed herein.
Figure 7:
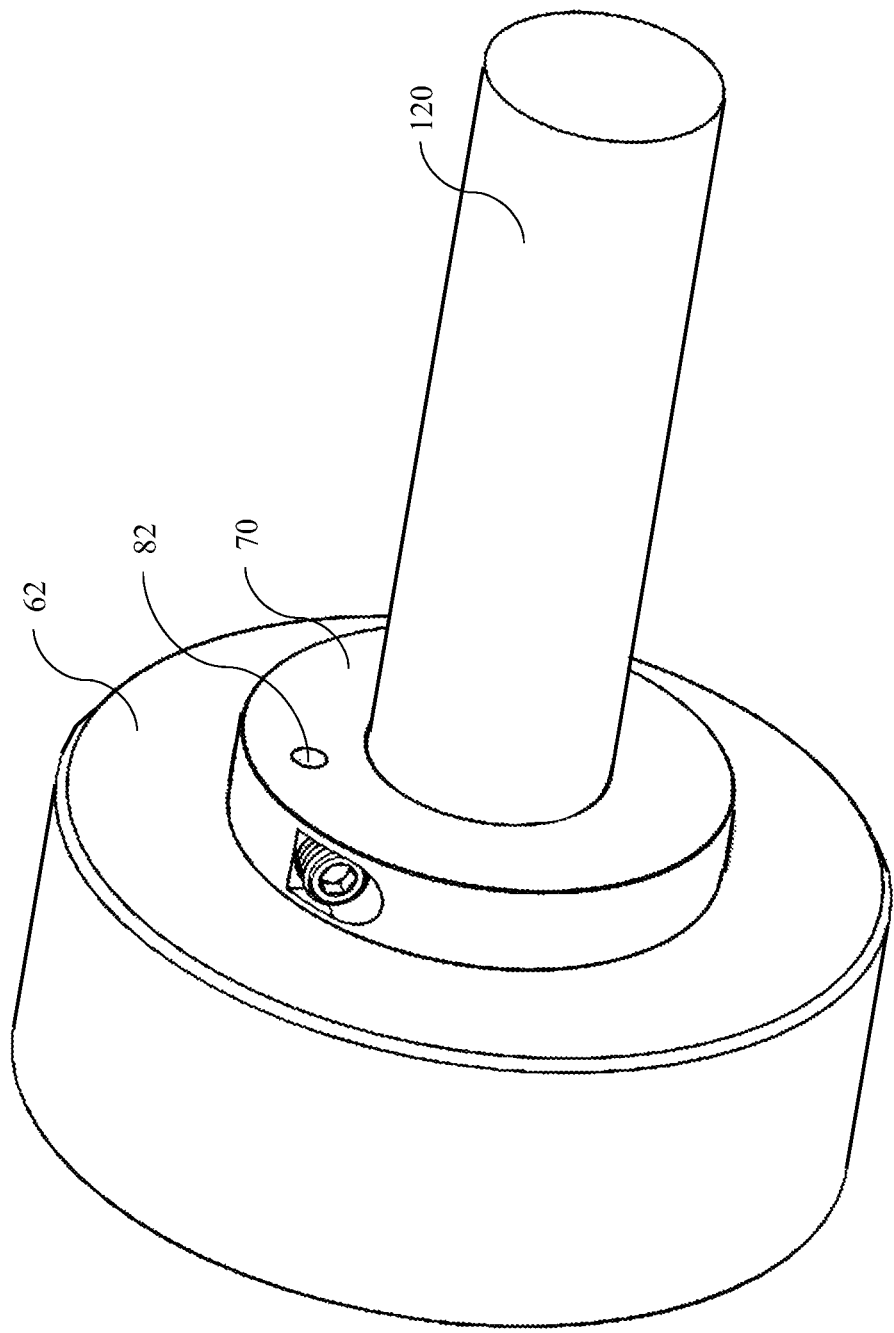
FIG. 7 is a perspective view of the roller assembly of FIG. 6.
Figure 8:
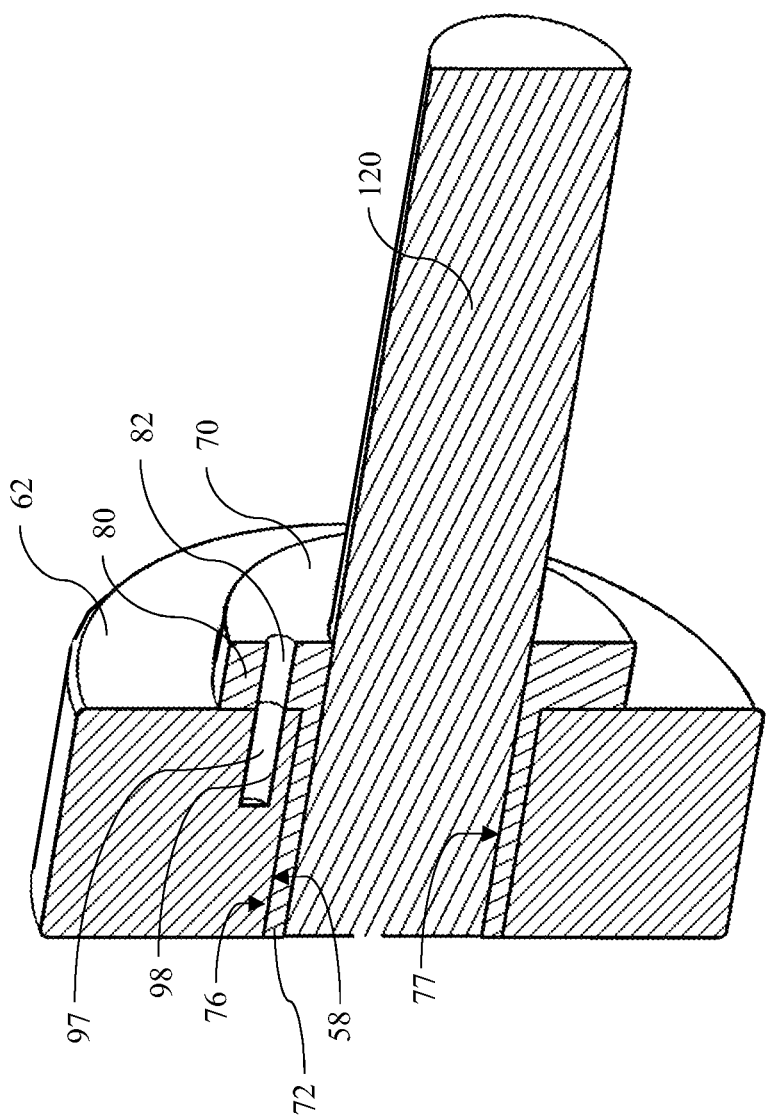
FIG. 8 is a cross-sectional view of the roller assembly of FIG. 6.
Figure 9:
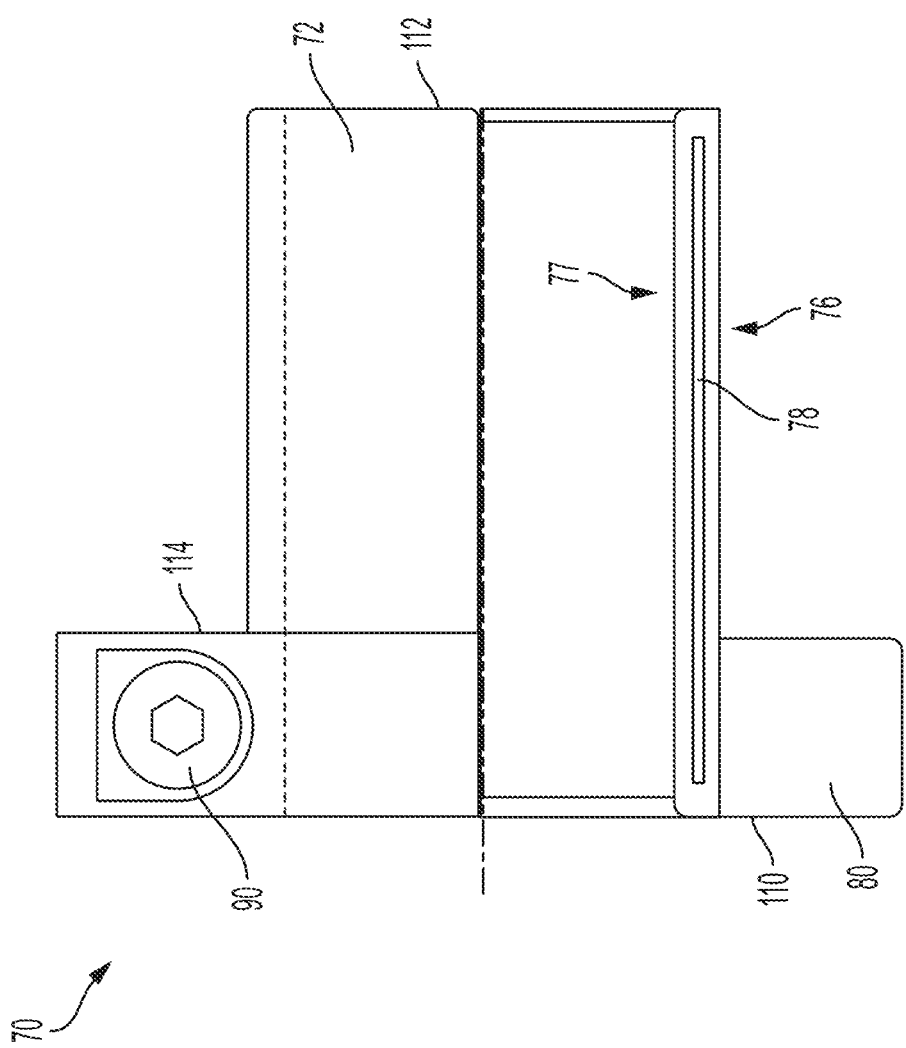
FIG. 9 is a partial sectional side view of a bushing of an exemplary roller assembly as disclosed herein.
Figure 10:
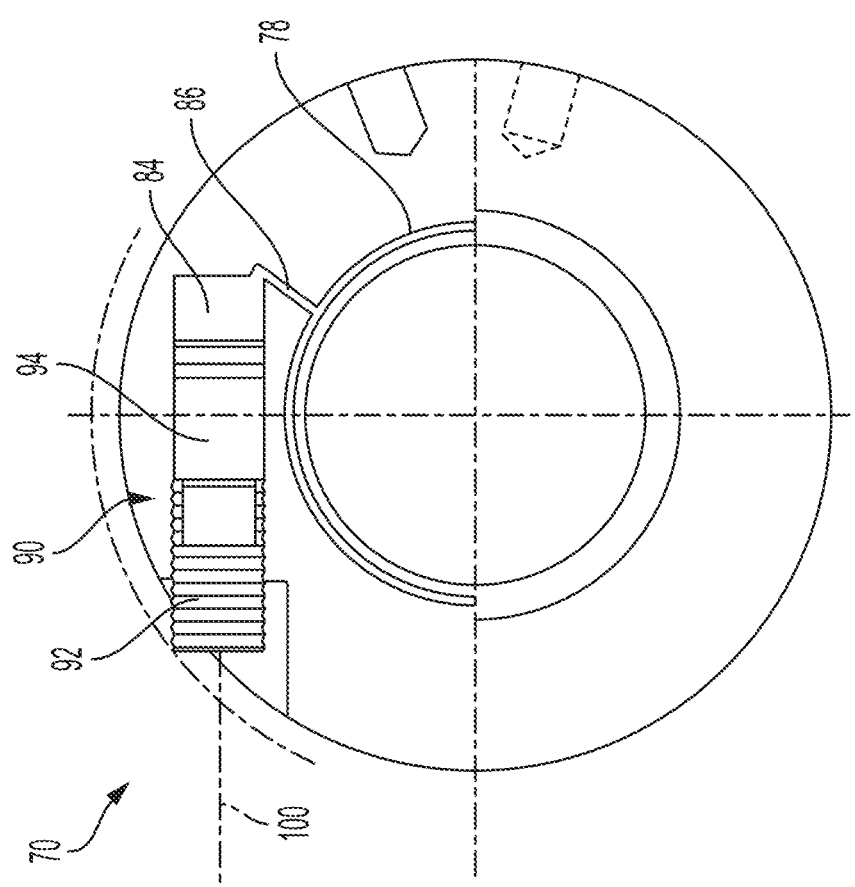
FIG. 10 is a partial sectional end view of the bushing of FIG. 9.

It is contemplated that, in some optional aspects, the annular body 62 can have an axial length along the central axis 52 that is significantly less than conventional headers (e.g., the header 12 of FIG. 1 and the split header 30 of FIG. 2). For example, in some aspects, the bushing 70 can provide sufficient grip between the roller 54 and the between the shaft 120 such that the header can be shorter (e.g., the axial length, or about the axial length of the sleeve 72). For example, the conventional headers can have an axial length of about 3.5 inches. In contrast, the annular body can optionally have an axial length that is about 2.5 inches or less than 2.5 inches or less than 2 inches (e.g., optionally, between 1.75 inches and 2 inches).

Figure 11:
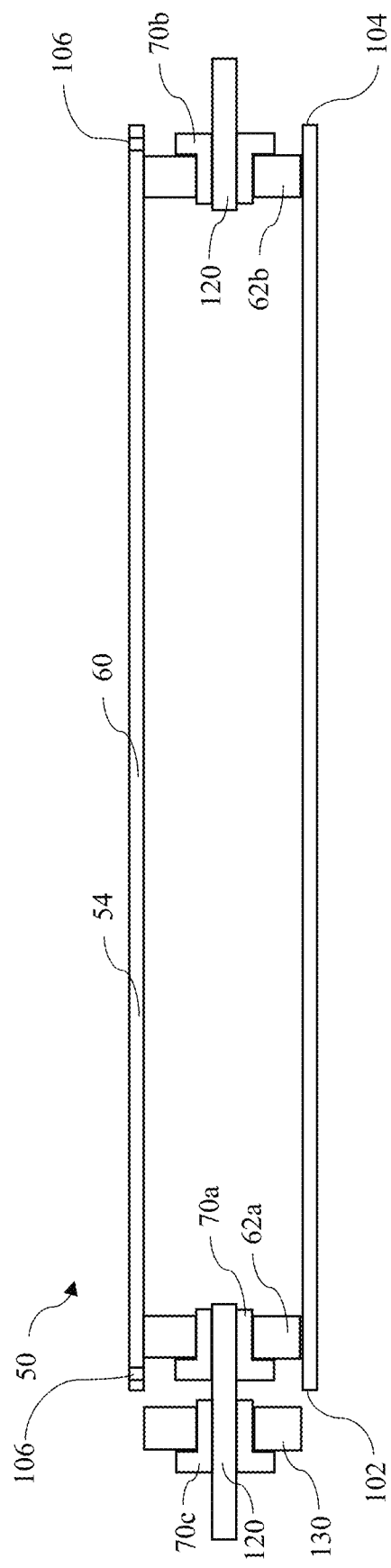
FIG. 11 is a schematic diagram of an exemplary roller assembly as disclosed herein.

Referring to FIG. 11, it is contemplated that the roller 54 can have a first annular body 62*a* and a second annular body 62*b* at the first and second axial ends 102, 104. A first bushing 70*a* can be positioned within the first annular body 62*a*, and a second bushing 70*b* can be positioned within the second annular body 62*b*. The actuators of each of the first and second annular bushings 70*a,b* can be positioned to cause the respective bladders to inflate to thereby couple respective shafts 120*a,b* to the first and second annular bodies 62*a,b* so that the shafts are fixedly coupled to the roller 54.

Figure 13:
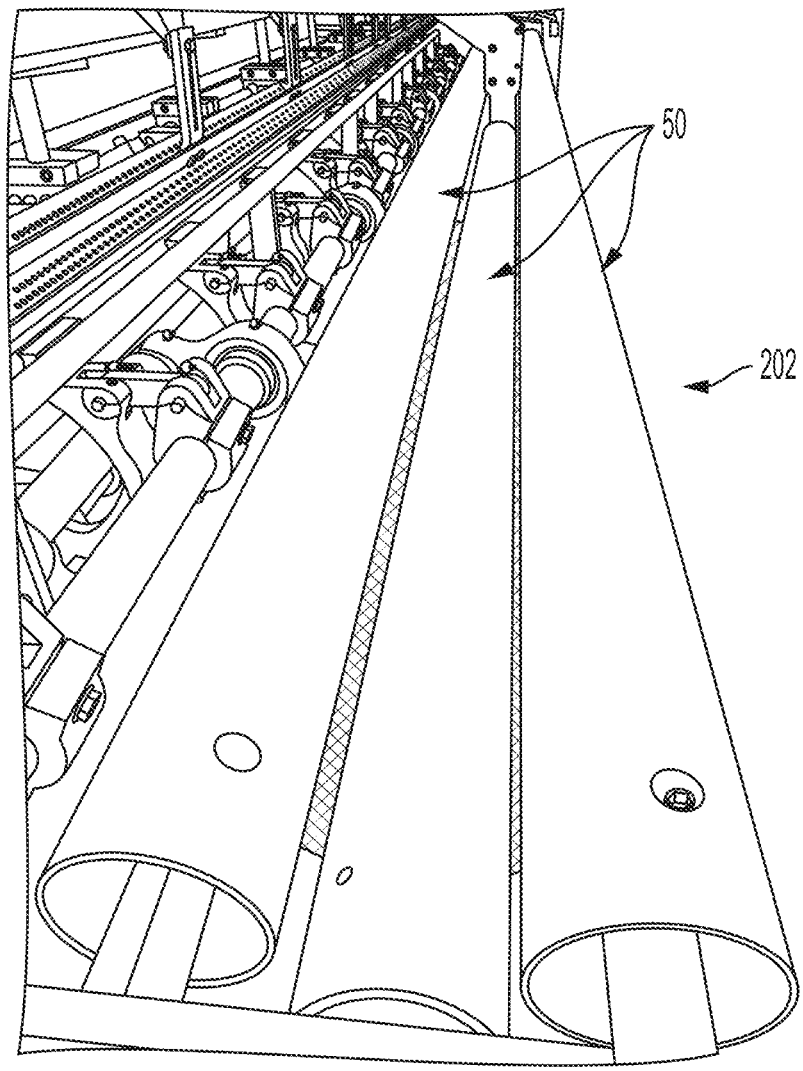
FIG. 13 is a perspective view of an exemplary cloth (out)feed roller system as disclosed herein.
Figure 14:
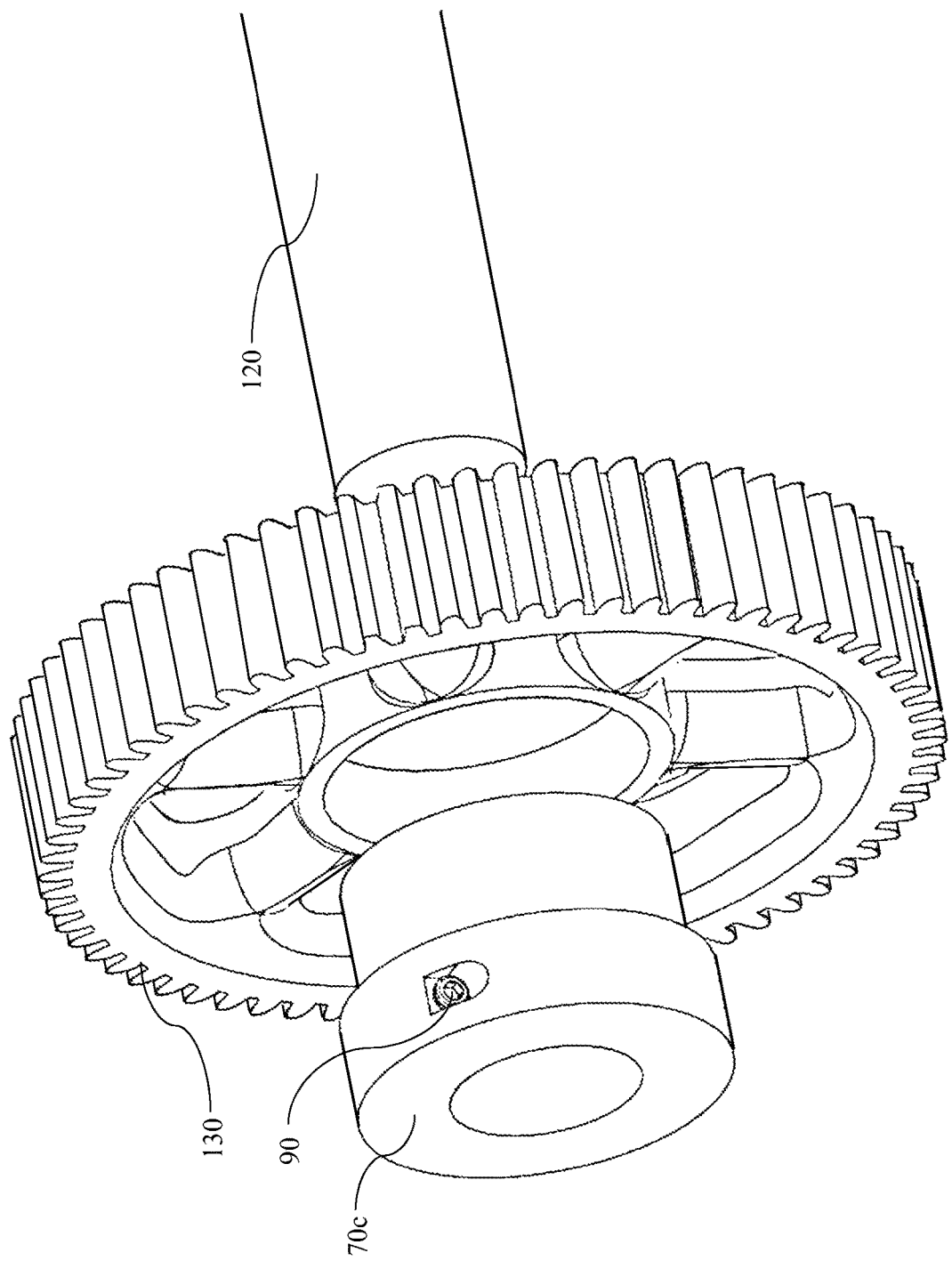
FIG. 14 is an exploded view of an exemplary assembly for coupling a gear to a roller assembly as disclosed herein.
Figure 15:
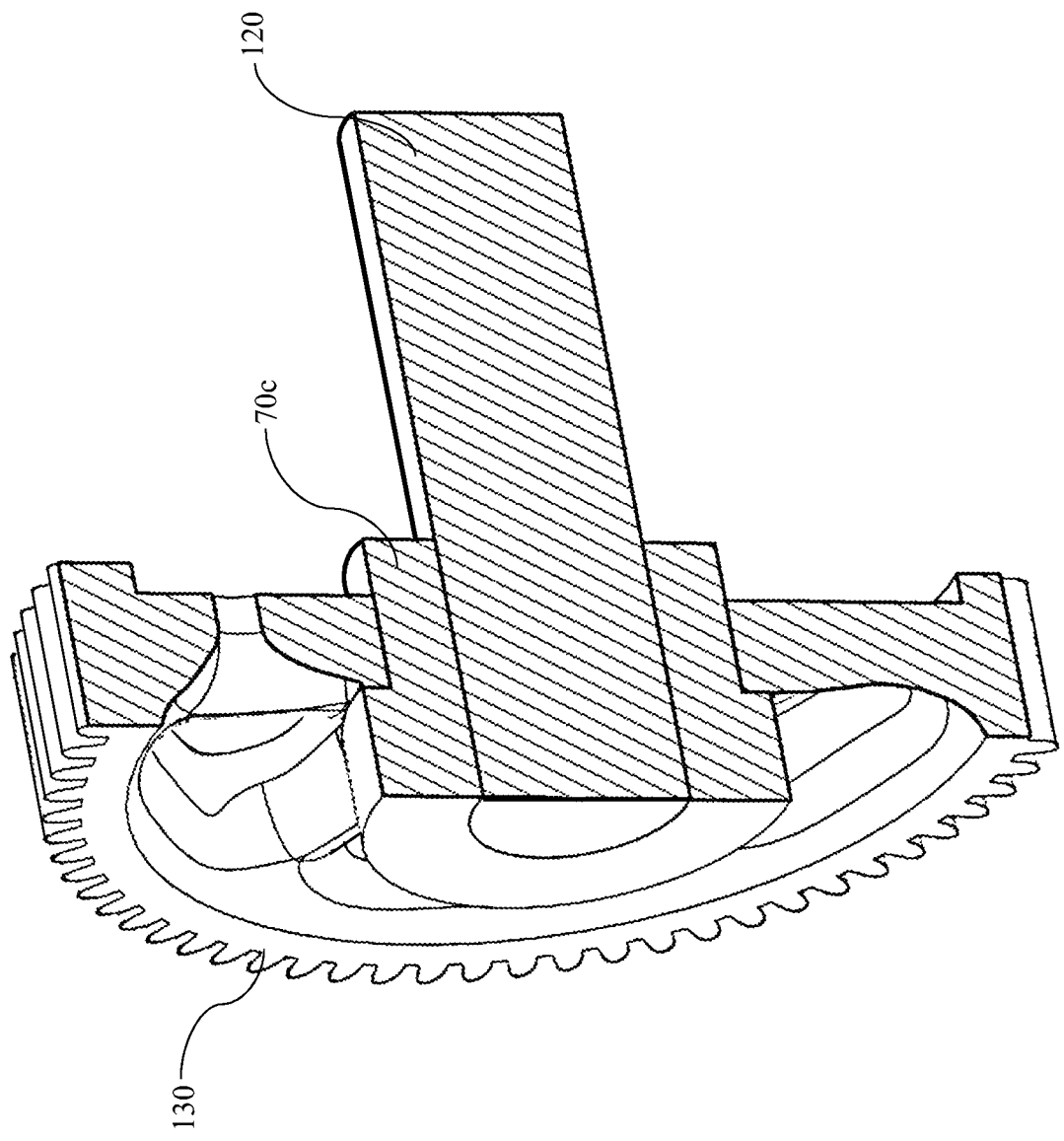
FIG. 15 is a sectional view of the assembly of FIG. 14.

Referring also to FIGS. 13-15, in some aspects, the roller assembly 50 can comprise a gear 130 (e.g., optionally, a spur gear) that is coupled to the shaft 120. The gear 130 can optionally couple to the shaft 120 via a third bushing 70*c* that can optionally be similar to or identical to the configuration of the first and second bushings 70*a,b*. The gear 130 can optionally be machined (e.g., bored out) to receive and couple to the third bushing 70*c*. The gear 130 can optionally be a dry gear. A drive gear not shown can be in communication with a motor and can apply torque to the gear 130 to effect rotation of the roller assembly via operative coupling to the shaft 120.

Figure 12:
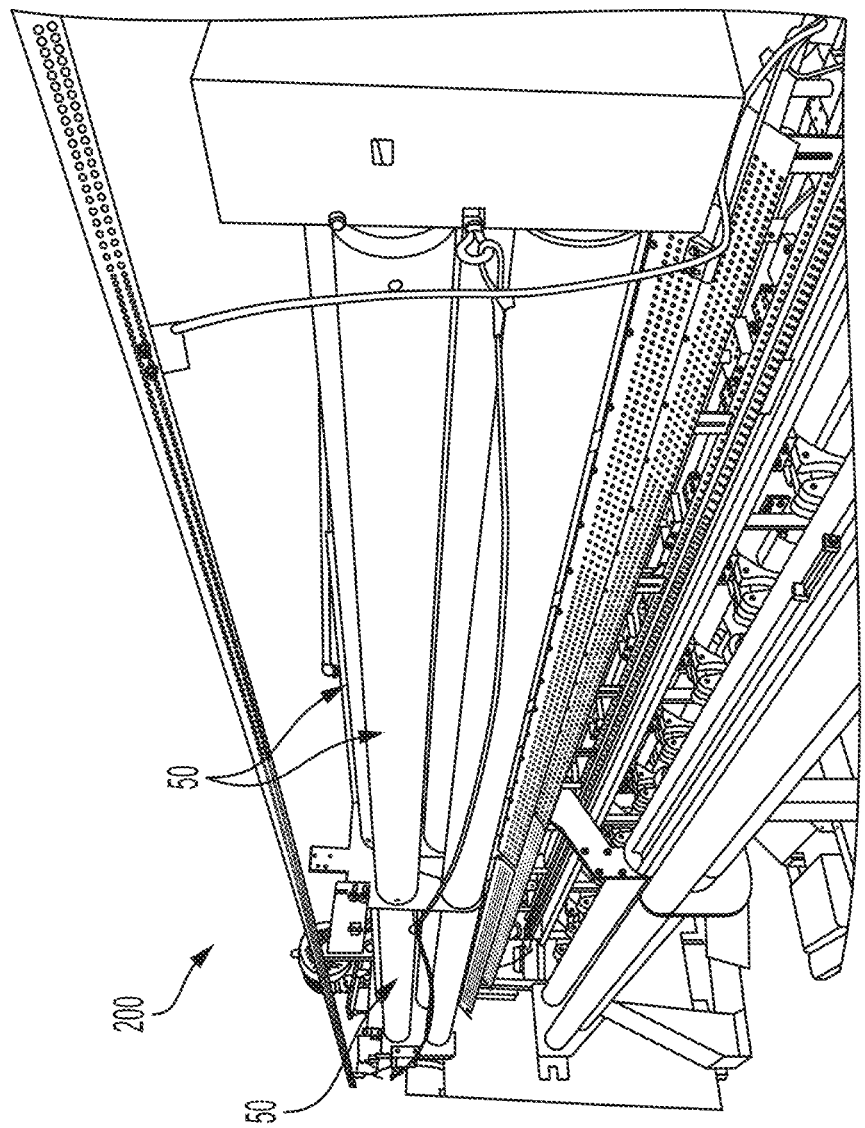
FIG. 12 is a perspective view of an exemplary yarn feed roller system as disclosed herein.

Each of the shafts 120 can be supported on bearings (e.g., optionally, roller bearings or journal bearings). In an exemplary aspect, a yarn feed roller system 200 (FIG. 12) can comprise a plurality of roller assemblies 50 as disclosed herein. For example, the yarn feed roller system can comprise four roller assemblies 50. Optionally, in use, it is contemplated that the yarn feed roller system 200 can be configured to deliver yarn to one or more needles of a tufting machine. Optionally, and as shown, the yarn feed roller system 200 can comprise four pairs of rollers positioned end-to-end. In further aspects, a cloth feed roller system 202 (FIG. 13) can comprise a plurality of (e.g., four) roller assemblies 50 as disclosed herein. Optionally, in use, it is contemplated that the cloth feed roller system 202 can be configured to move a backing material (e.g., a woven, non-woven, knitted, or needle-punched fabric) toward a tufting zone of a tufting machine.

The systems and apparatuses disclosed herein can enable quick removal and replacement of components, such as, for example, a roller 54, a shaft 120, a bushing 70, a gear 130, or a bearing that supports a shaft. For example, the shaft 120 can be inserted into the bushing 70, and the actuator 90 can be actuated to inflate the bladder and cause the bushing to frictionally engage the shaft to inhibit rotational movement between the bushing and the shaft. The actuator 90 can be actuated to deflate the bladder and decouple the bushing 70 from the roller and the shaft. In exemplary embodiments including an alignment element 96 inserted into the annular body, the alignment element 96 can be removed to decouple the bushing from the roller. One or more components can be replaced, and the system can be re-assembled and coupled via actuation of the actuator 90 (optionally, with the alignment element 96 inserted into the annular body).

Accordingly, embodiments disclosed herein can have various advantages over conventional feed roller systems. For example, the roller assembly can be less subject to loosening over time. Moreover, the roller assembly can be quickly disassembled and re-assembled. Further, the roller assembly can use smaller annular bodies than conventional headers, thereby using less material and being cheaper to manufacture. Still further, the shaft can advantageously be keyless, thereby eliminating the need to machine a keyway and eliminating the possibility of any rotational play that can occur from wear of a key or keyways. Additionally, concentricity between the roller and the shaft are improved over conventional systems.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: An apparatus having a central axis, the apparatus comprising:
  a roller having an outer surface and defining an inner bore;
  a bushing comprising:
    a sleeve having an outer surface and defining an inner bore, the inner bore of the sleeve having an operative circumference, wherein the sleeve comprises a bladder that is configured to expand radially upon receipt of a fluid to reduce the operative circumference of the inner bore;
    a flange extending radially outwardly from the sleeve, wherein the flange defines a vessel containing fluid therein, wherein the vessel is in fluid communication with the bladder of the sleeve;
    an actuator that is configured to cause the fluid from the vessel of the flange to flow into the bladder of the sleeve; and
    an alignment feature that is configured to rotationally position the roller relative to the bushing.

Aspect 2: The apparatus of aspect 1, wherein the wherein the flange defines a hole therethrough that is parallel or substantially parallel to the central axis, wherein the alignment feature comprises a fastener extending through the hole of the flange, wherein the fastener couples the bushing to the roller.

Aspect 3: The apparatus of aspect 2, wherein the actuator comprises:
  a piston; and
  a screw that is coupled to the piston, wherein rotation of the screw causes axial movement of the piston.

Aspect 4: The apparatus of aspect 3, wherein the roller defines an opening therethrough that is configured to receive a screw driver for rotating the screw of the actuator.

Aspect 5: The apparatus of any one of the preceding aspects, wherein the roller comprises:
  a hollow cylindrical tube defining the outer surface of the roller; and
  an annular body received within the hollow cylindrical tube, wherein the annular body is coupled to the hollow cylindrical tube via weldment.

Aspect 6: The apparatus of aspect 5, wherein the flange defines a hole therethrough that is parallel or substantially parallel to the central axis, wherein the alignment feature comprises a screw extending through the hole of the flange, wherein the annular body defines a hole having at least one female thread, wherein the screw is received by the at least one female thread of the annular body so that the screw couples the bushing to the roller.

Aspect 7: The apparatus of aspect 5 or aspect 6, wherein the bushing has first and second axial ends that are spaced along the central axis, wherein the flange is positioned at the first axial end of the bushing, wherein the flange defines an inner face that is axially spaced from the first axial end, wherein the inner face is positioned against the annular body.

Aspect 8: The apparatus of any one of the preceding aspects, wherein the apparatus does not comprise a key.

Aspect 9: The apparatus of any one of the preceding aspects, wherein the roller has a first axial end and an opposed second axial end, wherein the bushing is a first bushing, wherein the first bushing is positioned at the first axial end of the roller, wherein the apparatus further comprises a second bushing positioned at the second axial end of the roller.

Aspect 10: The apparatus of any one of the aspects, wherein the bushing is formed from a keyless shaft bushing.

Aspect 11: The apparatus of any one of the preceding aspects, wherein the roller has a first axial end and an opposed second axial end, wherein an entirety of the bushing is received within the roller between the first axial end and the second axial end.

Aspect 12: The apparatus of any one of aspects 5-11, wherein the annular body has an axial length along the central axis of less than 2.5 inches.

Aspect 13: The apparatus of any one of the preceding aspects, further comprising a shaft that is received within the inner bore of the sleeve of the bushing.

Aspect 14: The apparatus of aspect 13, wherein the actuator is positioned to cause frictional engagement between the shaft and the bushing to thereby inhibit rotational movement between the shaft and the bushing.

Aspect 15: The apparatus of aspect 13 or aspect 14, wherein the shaft does not comprise a keyway.

Aspect 16: The apparatus as in any one of aspects 13-15, wherein the bushing is a first bushing, the apparatus further comprising a second bushing and a gear, wherein the second bushing is positioned between the gear and the shaft, wherein the bushing rotationally couples the gear to the shaft.

Aspect 17: The apparatus of aspect 16, wherein the gear is a spur gear.

Aspect 18: A method comprising:
  inserting a shaft into an apparatus as in any one of aspects 1-17; and
  actuating the actuator to cause the bushing to frictionally engage the shaft to inhibit rotational movement between the bushing and the shaft.

Aspect 19: The method of aspect 18, further comprising: actuating the actuator to cause the bushing to decouple from the shaft.

Aspect 20: A system comprising: a plurality of apparatuses as in any one of aspects 1-17.

Aspect 21: The system of aspect 20, wherein the plurality of apparatuses comprises four apparatuses.

Aspect 22: The system of aspect 20 or aspect 21, wherein the system is a yarn feed roller system.

Aspect 23: The system of aspect 20 or aspect 21, wherein the system is a cloth feed roller system.

Aspect 24: A system comprising:
  a yarn feed roller system comprising:
    a roller having an outer surface and defining an inner bore;
    a shaft having an outer surface; and
    a keyless shaft bushing that couples the shaft to the roller, wherein the keyless shaft bushing comprises a sleeve having an outer surface and defining an inner bore, wherein the inner bore of the sleeve receives the shaft therein and biases against the outer surface of the shaft, wherein the outer surface of the sleeve of the keyless shaft bushing biases against the inner bore of the roller.

Aspect 25: A system comprising:
a cloth feed roller system comprising:
 a roller having an outer surface and defining an inner bore;
 a shaft having an outer surface; and
 a keyless shaft bushing that couples the shaft to the roller, wherein the keyless shaft bushing comprises a sleeve having an outer surface and defining an inner bore, wherein the inner bore of the sleeve receives the shaft therein and biases against the outer surface of the shaft, wherein the outer surface of the sleeve of the keyless shaft bushing biases against the inner bore of the roller.

Although the foregoing invention has been described in some detail by way of illustration and example for purposes of clarity of understanding, certain changes and modifications may be practiced within the scope of the appended claims.

What is claimed is:

1. An apparatus having a central axis, the apparatus comprising:
 a roller having an outer surface and defining an inner bore; and
 a bushing at least partially received within the inner bore of the roller and comprising:
  a sleeve having an outer surface and defining an inner bore, the inner bore of the sleeve having an operative circumference, wherein the sleeve comprises a bladder that is configured to expand radially upon receipt of a fluid to reduce the operative circumference of the inner bore;
  a flange extending radially outwardly from the sleeve, wherein the flange defines a vessel containing fluid therein, wherein the vessel is in fluid communication with the bladder of the sleeve; and
  an actuator that is configured to cause the fluid from the vessel of the flange to flow into the bladder of the sleeve, wherein the actuator comprises;
   a piston; and
   a screw that is coupled to the piston, wherein rotation of the screw causes axial movement of the piston; and
  an alignment feature that is configured to rotationally position the roller relative to the bushing,
 wherein the roller defines an opening therethrough that is configured to receive a screw driver for rotating the screw of the actuator of the bushing.

2. The apparatus of claim 1, wherein the wherein the flange defines a hole therethrough that is parallel or substantially parallel to the central axis, wherein the alignment feature comprises a fastener extending through the hole of the flange, wherein the fastener couples the bushing to the roller.

3. The apparatus of claim 1, wherein the roller comprises:
 a hollow cylindrical tube defining the outer surface of the roller; and
 an annular body received within the hollow cylindrical tube, wherein the annular body is coupled to the hollow cylindrical tube via weldment.

4. The apparatus of claim 3, wherein the flange defines a hole therethrough that is parallel or substantially parallel to the central axis, wherein the alignment feature comprises a screw extending through the hole of the flange, wherein the annular body defines a hole having at least one female thread, wherein the screw is received by the at least one female thread of the annular body so that the screw couples the bushing to the roller.

5. The apparatus of claim 3, wherein the bushing has first and second axial ends that are spaced along the central axis, wherein the flange is positioned at the first axial end of the bushing, wherein the flange defines an inner face that is axially spaced from the first axial end, wherein the inner face is positioned against the annular body.

6. The apparatus of claim 3, wherein the annular body has an axial length along the central axis of less than 2.5 inches.

7. The apparatus of claim 1, wherein the apparatus does not comprise a key.

8. The apparatus of claim 1, wherein the roller has a first axial end and an opposed second axial end, wherein the bushing is a first bushing, wherein the first bushing is positioned at the first axial end of the roller, wherein the apparatus further comprises a second bushing positioned at the second axial end of the roller.

9. The apparatus of claim 1, wherein the bushing is formed from a keyless shaft bushing.

10. The apparatus of claim 1, wherein the roller has a first axial end and an opposed second axial end, wherein an entirety of the bushing is received within the roller between the first axial end and the second axial end.

11. The apparatus of claim 1, further comprising a shaft that is received within the inner bore of the sleeve of the bushing.

12. The apparatus of claim 11, wherein the actuator is positioned to cause frictional engagement between the shaft and the bushing to thereby inhibit rotational movement between the shaft and the bushing.

13. The apparatus of claim 11, wherein the shaft does not comprise a keyway.

14. The apparatus of claim 11, wherein the bushing is a first bushing, the apparatus further comprising a second bushing and a gear, wherein the second bushing is positioned between the gear and the shaft, wherein the bushing rotationally couples the gear to the shaft.

15. The apparatus of claim 14, wherein the gear is a spur gear.

16. A method comprising:
 inserting a shaft into an inner bore of a sleeve of an apparatus having a central axis, the apparatus comprising:
  a roller having an outer surface and defining an inner bore; and
  a bushing at least partially received within the inner bore of the roller and comprising:
   the sleeve, the sleeve having an outer surface and defining the inner bore, the inner bore of the sleeve having an operative circumference, wherein the sleeve comprises a bladder that is configured to expand radially upon receipt of a fluid to reduce the operative circumference of the inner bore;
   a flange extending radially outwardly from the sleeve, wherein the flange defines a vessel containing fluid therein, wherein the vessel is in fluid communication with the bladder of the sleeve; and
   an actuator that is configured to cause the fluid from the vessel of the flange to flow into the bladder of the sleeve, wherein the actuator comprises;
    a piston; and
    a screw that is coupled to the piston, wherein rotation of the screw causes axial movement of the piston; and an alignment feature that is configured to rotationally position the roller relative to the bushing, wherein the roller defines an opening therethrough that is configured to receive a screw driver for rotating the screw of the actuator of the bushing; and actuating the actuator to cause the bushing to frictionally engage the shaft to inhibit rotational movement between the bushing and the shaft.

17. The method of claim 16, further comprising: actuating the actuator to cause the bushing to decouple from the shaft.

18. A system comprising: a plurality of apparatuses, each apparatus of the plurality of apparatuses having a central axis, each apparatus comprising:

a roller having an outer surface and defining an inner bore; and a bushing at least partially received within the inner bore of the roller and comprising:

a sleeve having an outer surface and defining an inner bore, the inner bore of the sleeve having an operative circumference, wherein the sleeve comprises a bladder that is configured to expand radially upon receipt of a fluid to reduce the operative circumference of the inner bore;

a flange extending radially outwardly from the sleeve, wherein the flange defines a vessel containing fluid therein, wherein the vessel is in fluid communication with the bladder of the sleeve; and an actuator that is configured to cause the fluid from the vessel of the flange to flow into the bladder of the sleeve, wherein the actuator comprises;

a piston; and a screw that is coupled to the piston, wherein rotation of the screw causes axial movement of the piston; and an alignment feature that is configured to rotationally position the roller relative to the bushing, wherein the roller defines an opening therethrough that is configured to receive a screw driver for rotating the screw of the actuator of the bushing.

19. The system of claim 18, wherein the plurality of apparatuses comprises four apparatuses.

20. The system of claim 18, wherein the system is a yarn feed roller system.

21. The system of claim 18, wherein the system is a cloth feed roller system.

* * * * *